(12) United States Patent
Kumar et al.

(10) Patent No.: US 7,569,085 B2
(45) Date of Patent: Aug. 4, 2009

(54) SYSTEM AND METHOD FOR HYDROGEN PRODUCTION

(75) Inventors: Ravi Vipperia Kumar, Irvine, CA (US); Vladimir Zamansky, Oceanside, CA (US); Boris Nikolaevich Eiteneer, Aliso Viejo, CA (US); Shawn David Barge, Orange, CA (US); Parag Prakash Kulkarni, Tustin, CA (US); Ke Liu, Rancho Santa Margarita, CA (US)

(73) Assignee: General Electric Company, Niskayuna, NY (US)

( * ) Notice: Subject to any disclaimer, the term of this patent is extended or adjusted under 35 U.S.C. 154(b) by 387 days.

(21) Appl. No.: 11/022,406

(22) Filed: Dec. 27, 2004

(65) Prior Publication Data

US 2006/0137246 A1 Jun. 29, 2006

(51) Int. Cl.
*C01B 3/36* (2006.01)
*C01B 3/00* (2006.01)
*B01J 7/00* (2006.01)
*B01J 8/04* (2006.01)
*B01J 10/00* (2006.01)

(52) U.S. Cl. .............................. 48/197 R; 48/61; 48/63; 48/94; 48/95; 48/113; 48/116; 48/117; 48/127.1; 48/127.7; 48/197 FM; 48/198.1; 48/204; 48/211; 48/212; 48/213; 422/171; 422/176; 422/177; 422/180; 422/188; 422/191; 422/193; 422/211; 422/222; 422/236

(58) Field of Classification Search .................. 48/61, 48/63, 113, 94, 95, 180.1, 116, 117, 197 R, 48/212, 127.1, 127.3, 127.5, 127.7, 198.1, 48/204, 211, 213; 422/191, 211, 171, 176, 422/177, 180, 193, 222, 236
See application file for complete search history.

(56) References Cited

U.S. PATENT DOCUMENTS

| | | | | |
|---|---|---|---|---|
| 3,264,066 A | * | 8/1966 | Quartulli et al. | ............. 423/654 |
| 3,278,452 A | * | 10/1966 | Vorum | ......................... 252/376 |
| 4,788,004 A | * | 11/1988 | Pinto et al. | ................... 252/373 |
| 4,888,130 A | * | 12/1989 | Banquy | ....................... 252/373 |
| 4,999,133 A | * | 3/1991 | Banquy | ....................... 252/373 |
| 5,006,131 A | * | 4/1991 | Karafian et al. | ................ 48/94 |
| 5,248,567 A | * | 9/1993 | Amemiya et al. | .............. 429/20 |
| 5,879,537 A | * | 3/1999 | Peters | ......................... 208/134 |
| 5,938,800 A | * | 8/1999 | Verrill et al. | ................ 48/127.9 |
| 5,938,975 A | * | 8/1999 | Ennis et al. | ................... 252/373 |
| 6,156,084 A | * | 12/2000 | Bonville et al. | ................. 48/61 |
| 6,162,267 A | * | 12/2000 | Priegnitz et al. | ........ 48/199 FM |
| 6,293,979 B1 | | 9/2001 | Choudhary et al. | |
| 6,375,924 B1 | * | 4/2002 | Towler et al. | ................ 423/656 |

(Continued)

FOREIGN PATENT DOCUMENTS

| EP | 0 360 505 | 2/1994 |
|---|---|---|
| GB | 929659 | 6/1963 |
| WO | WO 2004/028685 | 4/2004 |

*Primary Examiner*—Walter D Griffin
*Assistant Examiner*—Huy-Tram Nguyen
(74) *Attorney, Agent, or Firm*—Paul J. DiConza

(57) ABSTRACT

A system for production of hydrogen comprises at least one steam reforming zone configured to receive a first fuel and steam to produce a first reformate gas stream comprising hydrogen using a steam reforming process. The system further comprises a mixed reforming zone configured to receive an oxidant to produce a second reformate gas stream comprising hydrogen, wherein the first reformate gas stream is sent to the mixed reforming zone to complete the reforming process.

24 Claims, 8 Drawing Sheets

U.S. PATENT DOCUMENTS

| | | |
|---|---|---|
| 6,680,044 B1 | 1/2004 | Tonkovich et al. |
| 6,921,516 B2 * | 7/2005 | Goebel et al. ............... 422/191 |
| 7,255,840 B2 * | 8/2007 | Papavassiliou et al. ...... 422/190 |
| 2002/0000539 A1 | 1/2002 | Gaffney et al. |
| 2002/0002794 A1 | 1/2002 | Figueroa et al. |
| 2002/0012624 A1 | 1/2002 | Figueroa et al. |
| 2002/0013225 A1 | 1/2002 | Figueroa et al. |
| 2002/0013618 A1 * | 1/2002 | Marotta et al. ............. 623/1.15 |
| 2002/0110710 A1 * | 8/2002 | Keskula et al. ................ 429/13 |
| 2002/0115730 A1 | 8/2002 | Allison et al. |
| 2003/0007904 A1 | 1/2003 | Tonkovich et al. |
| 2003/0019363 A1 * | 1/2003 | Grover et al. ................. 96/189 |
| 2003/0021748 A1 | 1/2003 | Hwang et al. |
| 2003/0022950 A1 * | 1/2003 | Keppeler .................... 518/726 |
| 2003/0045423 A1 | 3/2003 | Dindi et al. |
| 2003/0093950 A1 * | 5/2003 | Goebel et al. ............. 48/197 R |
| 2003/0154654 A1 * | 8/2003 | Goebel ....................... 48/198.3 |
| 2003/0190503 A1 * | 10/2003 | Kumar et al. .................. 429/17 |
| 2004/0058230 A1 | 3/2004 | Hsu |
| 2004/0226217 A1 * | 11/2004 | Ahmed et al. ............... 48/127.9 |
| 2004/0245086 A1 * | 12/2004 | Steynberg et al. ........... 204/164 |
| 2004/0250472 A1 * | 12/2004 | Okada et al. ............... 48/214 A |
| 2005/0123810 A1 * | 6/2005 | Balan .......................... 429/19 |
| 2006/0168887 A1 * | 8/2006 | Baumann et al. .......... 48/197 R |
| 2007/0010590 A1 * | 1/2007 | Abbott et al. ............... 518/703 |
| 2008/0039652 A1 * | 2/2008 | Thiebaut ..................... 562/512 |

* cited by examiner

SYSTEM AND METHOD FOR HYDROGEN PRODUCTION

BACKGROUND OF THE INVENTION

This invention relates to production of hydrogen from fuels comprising at least one of carbon, oxygen or hydrogen and more specifically to production of hydrogen in a compact reformer.

Currently, the most cost effective method of producing hydrogen is centralized steam reforming of fuels such as natural gas and methanol. Rising energy prices and concern for the environment are prompting increased attention to hydrogen as a renewable energy source. Hydrogen has been proposed as a clean fuel for the future with applications in vehicle and stationary power (electric utility).

The largest volumes of merchant hydrogen are consumed in ammonia plants, in refineries and in methanol production. Only a fraction of hydrogen is currently used for energy purposes. However, hydrogen's share in the energy market is increasing with the implementation of fuel cell systems and the growing demand for low emission or zero-emission fuels.

Steam methane reforming (SMR), autothermal reforming (ATR) and catalytic partial oxidation (CPO) have been studied for distributed hydrogen generation from natural gas (NG) for fuel cells applications. SMR utilizes high temperature reforming catalysts to convert NG and steam to a synthesis gas (syngas). Conventional ATR typically includes a catalyst to facilitate both SMR and CPO reactions. Conventional SMR systems are not compact since large heat exchange surface area are required to provide heat to the endothermic steam methane reforming reaction.

Direct CPO (without an SMR catalyst) is a compact system. However, CPO generates a syngas with a low hydrogen ($H_2$) to carbon monoxide (CO) ratio (~2) and hence is better suited for Fischer-Tropsch or methanol synthesis.

Therefore there is a need for a compact system for hydrogen production that is cost effective with efficient heat integration.

BRIEF DESCRIPTION OF THE INVENTION

In one aspect, a system for production of hydrogen comprises at least one steam reforming zone configured to receive a first fuel and steam to produce a first reformate gas stream comprising hydrogen using a steam reforming process. The system further comprises a mixed reforming zone configured to receive an oxidant to produce a second reformate gas stream comprising hydrogen, wherein the first reformate gas stream is sent to the mixed reforming zone to complete the reforming process.

In another aspect, a system for production of hydrogen comprises at least one steam reforming zone configured to receive a first fuel and steam to produce a first reformate gas stream comprising hydrogen in a reforming process. The system further comprises a first catalytic oxidation zone and a second catalytic oxidation zone. The first catalytic zone is configured to receive a heated oxidant and a second fuel to produce a second reformate gas stream comprising hydrogen. The first reformate gas stream is sent directly to the second catalytic partial oxidation zone to complete the reforming process. The system also comprises a heat exchange zone and a shift zone. The heat exchange zone is configured to receive an oxidant and the second reformate gas stream, wherein heat is transferred from the second reformate gas stream to the oxidant to generate a cooled second reformate gas stream and the heated oxidant.

In yet another aspect, a method for producing hydrogen comprises steam reforming a first fuel to produce a first reformate gas stream comprising hydrogen. The method further comprises partially oxidizing a second fuel and an oxidant in a first catalytic partial oxidation zone to produce a second reformate gas stream comprising hydrogen and introducing the first reformate gas stream to a second catalytic oxidation zone. The method also includes introducing a mixture of the first reformate gas stream and the second reformate gas stream to a shift zone to produce a third reformate gas stream rich in hydrogen.

DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
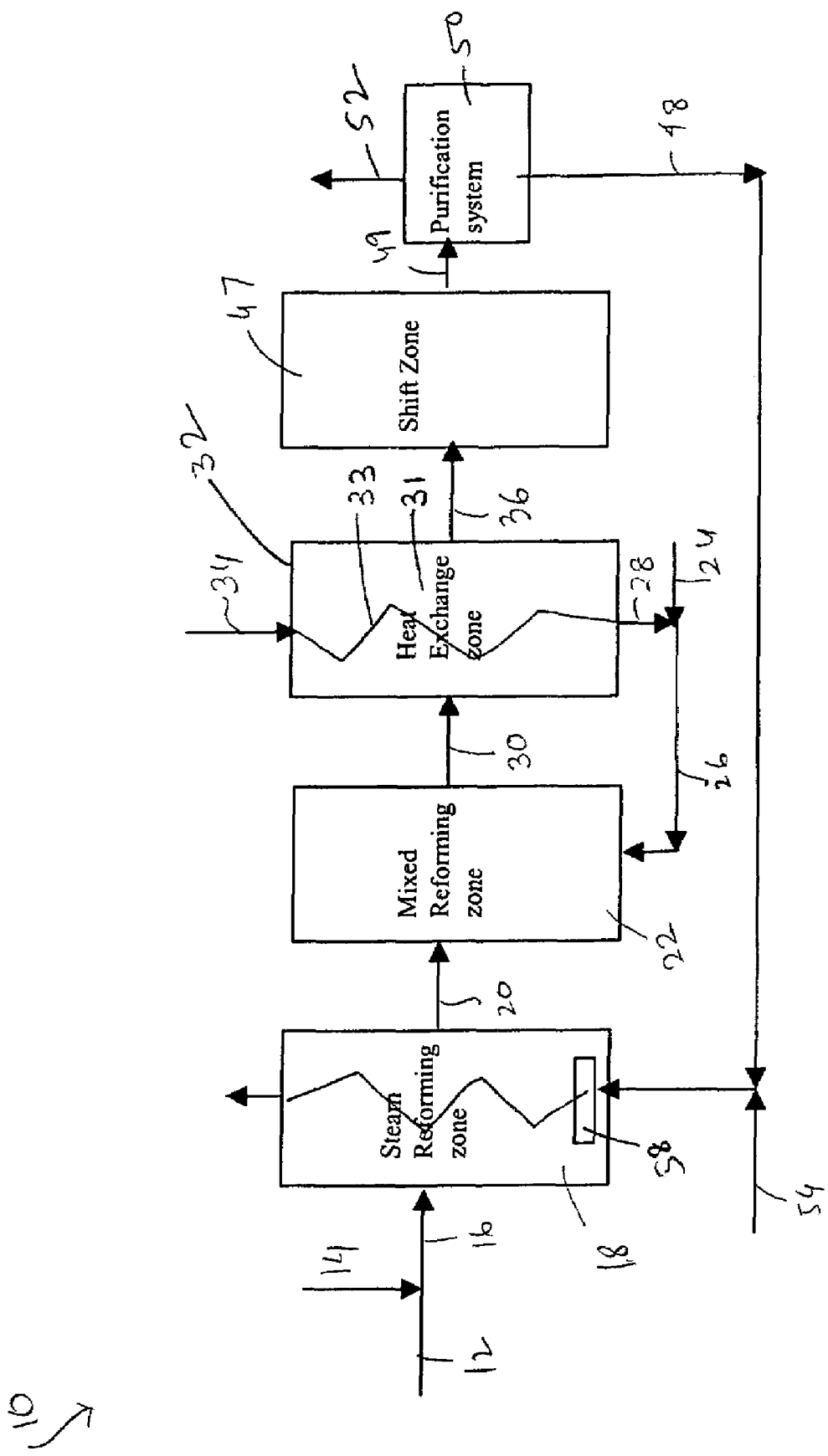
FIG. 1 illustrates an exemplary system for hydrogen production.

FIG. 1 represents an exemplary system 10 for producing hydrogen comprising at least one steam reforming zone 18 and at least one mixed reforming zone 22. The steam reforming zone 18 is configured to receive a first fuel 12 and steam 14 and produce a first reformate gas stream 20 comprising hydrogen. In one embodiment, the first fuel 12 and the steam 14 are mixed to form a mixed stream 16, which mixed stream 16 is introduced into the steam reforming zone 18. The first reformate gas stream 20 is sent to the mixed reforming zone 22 to complete the reforming process. The mixed reforming zone 22 comprises a catalyst for performing catalytic partial oxidation. In one embodiment, the mixed reforming zone comprises catalysts for performing both catalytic partial oxidation (CPO) and steam reforming functions. The mixed reforming zone 22 is configured to receive an oxidant 28 and optionally a second fuel 24 and to produce a second reformate gas stream 30 comprising hydrogen. The mixed reforming zone 22 facilitates both catalytic partial oxidation and steam reforming processes. In one embodiment, the mixed reforming zone 22 is configured to receive the oxidant 28 and the first reformate gas stream 20. In yet another embodiment, the mixed reforming zone 22 is configured to receive the second fuel 24, the first reformate gas stream 20 and the oxidant 28. In some embodiments, the system 10 further comprises a heat exchange zone 32. The heat exchange zone 32 is configured to receive the second reformate gas stream 30 on a hot side 31 and an oxidant 34 on a cold side 33 and heat the oxidant 34 to a heated oxidant stream 28, which heated stream 28 is mixed with the optional second fuel 24 to form a mixed stream 26. The mixed stream 26 is sent to the mixed reforming zone 22. In this process, the second reformate gas stream 30 is cooled to generate a cooled stream 36 comprising hydrogen. In some embodiments, the optional second fuel 24 may also be heated in the heat exchange zone 32.

The exemplary system 10 may further comprise a shift reaction zone 47. The cooled stream 36 from the heat exchange zone 32 is sent to a shift reaction zone 47, wherein in the presence of a shift catalyst the carbon monoxide in the stream 36 is converted to carbon dioxide and hydrogen and generates a third reformate gas stream 49 rich in hydrogen. Shift catalyst may include a high temperature shift catalyst (HTS) or a low temperature shift catalyst (LTS) or a combination of HTS and LTS catalysts. The third reformate gas stream 49 rich in hydrogen is further treated in a purification system 50 to generate a hydrogen rich product stream 52 and an off gas 48. In one embodiment, the off gas 48 comprising unconverted fuel, carbon monoxide, hydrogen and carbon dioxide is combusted in a combustor 58 with an oxidant 54 to supply the heat for the reforming reaction in the steam reforming zone 18. It should be noted that any other fuel may also be used in the combustor 58 to supply the heat for the reforming reaction in the steam reforming zone 18.

Figure 2:
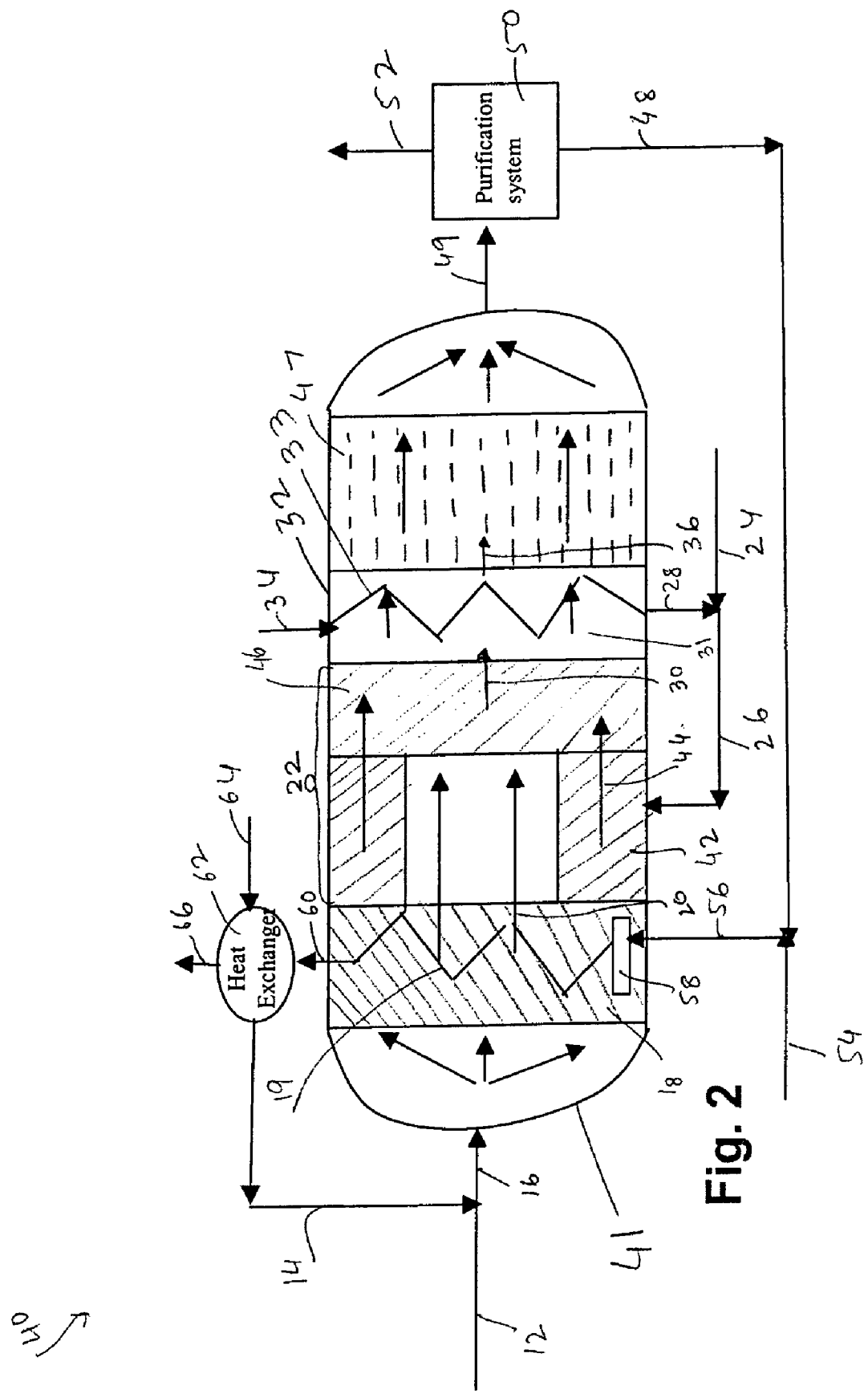
FIG. 2 illustrates an exemplary compact system for hydrogen production.

FIG. 2 represents an exemplary compact system 40 for hydrogen production, wherein all the catalyst zones described previously are configured to be disposed within a single vessel 41. As illustrated in FIG. 2, the system 40 comprises at least one steam reforming zone 18 and a mixed reforming zone 22. The steam reforming zone 18 is configured to receive a first fuel 12 and steam 14 and produce a first reformate gas stream 20 comprising hydrogen. The first reformate gas stream 20 is sent to the mixed reforming zone 22 to complete the reforming process. The mixed reforming zone 22 comprises a first CPO zone 42 and a second CPO zone 46. The optional second fuel 24 and the heated oxidant 28 are introduced in the first CPO zone 42 to generate a syngas 44 comprising carbon monoxide, carbon dioxide, unconverted fuel, hydrogen and water. The syngas 44 is mixed with the first reformate gas stream 20 in the second CPO zone 46 to form the second reformate gas stream 30. Thus the first CPO zone 42 facilitates the CPO reaction, whereas the second CPO zone 46 facilitates both the CPO and steam reforming reactions. The second reformate gas stream 30 comprising hydrogen is introduced to a heat exchange zone 32 as described in the preceding section. The cooled stream 36 from the heat exchange zone 32 is sent to a shift zone 47, wherein in the presence of a shift catalyst the carbon monoxide in the stream 36 is converted to carbon dioxide and hydrogen and generates a third reformate gas stream 49 rich in hydrogen. Shift catalyst may include a high temperature shift catalyst (HTS) or a low temperature shift catalyst (LTS) or a combination of HTS and LTS catalysts. It should be noted that the configurations for heating the oxidant 28 and the optional second fuel 24 as illustrated in FIGS. 1-2 are non-limiting and heating of the oxidant 34 or optional second fuel 24 may be achieved by utilizing heat available at any section of the hydrogen production systems described herein.

Hydrogen is produced by reforming a hydrocarbon fuel, such as natural gas along with steam in the steam reforming zone 18. Conventional steam reforming process is energy intensive and significant heat is needed in the overall reforming process. The main constituent of natural gas is methane ($CH_4$) that reacts with steam in a two-step reaction to produce hydrogen. In accordance with the present technique as shown in FIGS. 1 and 2, natural gas is converted to hydrogen following the reactions (1) and (2) as mentioned below.

  (1)

  (2)

At least a portion of the incoming first fuel 12 is converted to generate hydrogen by the steam reforming process in the steam reforming zone 18. The first reaction (1) as described above typically takes place in the steam reforming zone 18, wherein the fuel such as methane reacts with steam to produce carbon monoxide and hydrogen. In one embodiment, the first reformate gas stream 20 generated from the steam reforming zone 18 comprises carbon monoxide (CO), carbon dioxide ($CO_2$), hydrogen ($H_2$), unutilized fuel and water. The second reaction (2) is the shift reaction, wherein carbon monoxide is converted to carbon dioxide and this reaction mainly takes place in the low temperature shift reaction zone 47.

The steam reforming zone 18 comprises the steam reforming (SR) catalyst that pre-reforms the first fuel 12 and steam at a temperature of about 200° C. to about 1200° C. depending upon the type of fuel used in the steam reforming zone 18. When natural gas is used as the first fuel 12, in one embodiment, the temperature of the steam reforming zone 18 is at about 550° C. to about 1200° C., and in another embodiment, the temperature of the steam reforming zone 18 is at about 700° C. to about 900° C. When ethanol is used as the first fuel 12, in one embodiment, the temperature of the steam reforming zone 18 is at about 350° C. to about 850° C., and in another embodiment, the temperature of the steam reforming zone 18 is at about 400° C. to about 600° C. When methanol is used as the first fuel 12, in one embodiment, the temperature of the steam reforming zone 18 is at about 200° C. to about 400° C. Since the steam reforming catalyst in zone 18 is a short contact time catalyst and is used only for the pre-reforming process, the gas hourly space velocity (GHSV) in the steam reforming catalyst is in the range of about 720 $hr^{-1}$ to about 360,000 $hr^{-1}$. In one embodiment, the GHSV in the steam reforming catalyst is in the range of about 50,000 $hr^{-1}$ to about 360,000 $hr^{-1}$. In operation, sufficient pre-reforming prior to CPO can be performed at GHSV greater than about 50,000 $hr^{-1}$ in the steam reforming catalyst. Therefore, the volume of the steam reforming zone 18 can be reduced significantly as compared to conventional steam reforming reactors. Operationally, the steam reforming zone 18, as described in FIGS. 1-2, acts as a heat exchanger, wherein the hot side of the reforming zone includes a combustor 58, which combustor 58 is used to combust an oxidant 54 and a fuel 48 (off-gas from the hydrogen purification system 50).

The compact system 40 for hydrogen production as illustrated in FIG. 2 utilizes the concept of staging the CPO catalyst in the first and second CPO zones 42 and 46. The catalyst used herein is a short contact catalyst configured to handle a very high gas hourly space velocity (GHSV), for example in the range of about 3,600 $hr^{-1}$ to about 7,200,000 $hr^{-1}$. In one embodiment, the GHSV in the CPO catalyst is in the range of about 200,000 $hr^{-1}$ to about 1,000,000 $hr^{-1}$.

The primary reactions that occur over the CPO catalyst are indicated in reactions 3-5 below:

  (3)

  (4)

  (5)

The catalysts used in the systems described herein are based on short-contact time catalysts for first and second CPO zones 42 and 46, steam reforming zone 18 and the shift zone 47.

This combination and integration of catalysts decreases the size and cost of the reformer significantly.

The heated oxidant 28 is mixed with the optional second fuel 24 and the mixed stream 26 is processed over the first CPO zone 42 comprising a short contact time CPO catalyst to generate a syngas 44. The first reformate gas stream 20 that is the pre-reformed gas from the steam reforming zone 18 bypasses the first CPO zone 42, thus preventing the oxidant 28 from mixing with the first reformate gas stream 20 and potentially oxidizing the $H_2$ and CO contained therein. The first reformate gas stream 20 and the syngas 44 from the first CPO zone 42 are then mixed together over the second CPO zone 46 to complete the reforming process of the fuel. The second CPO zone 46 is configured to operate at about 700° C. to about 1200° C. to achieve high fuel conversion and to maximize $H_2$ yield. In operation, the steam reforming reaction may also take place in second CPO zone 46 as the first reformate stream 20 is mixed with the syngas 44 in second CPO zone 46.

In some embodiments, the two stages of the CPO catalyst can be joined into one stage (as shown in FIG. 1) as long as $H_2$ and CO oxidation can be minimized. This can be accomplished by utilizing short contact time selective heterogeneous catalysts and by keeping the mixing times between pre-reformed gas and air below the induction time for unwanted homogeneous oxidation reactions between $H_2$, CO and the oxidant.

The second reformate gas stream 30 comprising hydrogen generated by the CPO zones 42 and 46 is cooled in the heat exchange zone 32 before being introduced to a short contact time shift catalyst in the shift zone 47. The shift zone is configured to facilitate the shift reaction (2) to reduce the CO concentration and generate more hydrogen to produce a third reformate gas stream 49 rich in hydrogen. The GHSV in the shift catalyst in the shift zone 47 is maintained in the range of about 720 hr$^{-1}$ to about 360,000 hr$^{-1}$. In one embodiment, the GHSV in the shift catalyst is in the range of about 50,000 hr$^{-1}$ to about 360,000 hr$^{-1}$.

The third reformate gas stream 49 rich in hydrogen is further treated in a purification system 50 to generate a hydrogen product stream 52 and an off gas 48. As indicated earlier, the off gas 48 comprising unconverted fuel, carbon monoxide, and carbon dioxide is combusted with the oxidant 54 to supply the heat for the endothermic reforming reaction (1) in the steam reforming zone 18. The purification process may apply various techniques known in the art, including but not limited to pressure swing adsorption, chemical absorption and membrane separation to generate the hydrogen rich product gas stream 52.

The methods to separate hydrogen from other gases to produce the hydrogen rich product stream 52 include pressure swing adsorption (PSA) and membrane separation. Pressure swing adsorption (PSA) may be used for separation of hydrogen from a mixture of gases containing hydrogen. In PSA techniques, at a high partial pressure, solid molecular sieves can adsorb gases such as carbon dioxide more strongly than hydrogen. As a result, at elevated pressures, gases other than hydrogen are removed selectively from the mixture of gases comprising hydrogen when this mixture is passed through an adsorption bed. Regeneration of the bed is accomplished by depressurization and purging. Typically for critical operations, a plurality of adsorption vessels are used for continuous separation of hydrogen, wherein one adsorption bed is used while the others are regenerated.

In one embodiment, a membrane separation unit may be used in the purification system. A variety of polymers may be used for hydrogen selective membranes, which membranes operate at relatively low temperatures. In one embodiment, the separation efficiency of the hydrogen can be enhanced by combining a PSA unit with $CO_2$ separation membranes. In the first step $H_2$ is separated by a PSA technique. In the next step, $CO_2$ is separated by $CO_2$ selective membranes. Some polymeric membranes show good permeability and selectivity for $CO_2$ separation at relatively low temperature.

In another embodiment, the hydrogen separator may use a cryogenic separation technique. Cryogenic separation may be used when it is important to recover multiple fractionates and multiple products. In one embodiment, the third reformate gas stream 49 from the shift reactor is compressed to approximately 900 psia and then cooled to room temperature using a condenser, which condenser liquefies the $CO_2$. Hydrogen can be recovered as a gas from this process, while the $CO_2$ is removed as liquid from the bottom of the condenser. The hydrogen separator may further be integrated with a moisture separator.

Another technique for purification of the third reformate gas steam 49 includes separation of carbon dioxide from the third reformate gas stream 49 by chemical absorption using oxides, such as, calcium oxide (CaO) and magnesium oxide (MgO) or a combination thereof. In one embodiment, at elevated pressure and temperature, $CO_2$ is absorbed by CaO forming calcium carbonate ($CaCO_3$), thereby removing $CO_2$ from the gas mixture. The sorbent CaO is regenerated by calcinations of $CaCO_3$, which generates CaO and $CO_2$.

Yet another technique used for separation of $CO_2$ from the third reformate gas stream 49 may include, but is not limited to, chemical absorption of $CO_2$ using amines. The third reformate gas stream 49 is cooled to a suitable temperature to make use of chemical absorption of carbon dioxide using amines. This technique is based on alkanol amine solvents that have the ability to absorb carbon dioxide at relatively low temperatures, and are easily regenerated by raising the temperature of the rich solvents. The solvents used in this technique may include, for example, triethanolamine, monoethanolamine, diethanolamine, diisopropanolamine, diglycolamine, and methyldiethanolamine.

The fuel used in the systems for hydrogen production disclosed herein may comprise any suitable gas or liquid, such as for example, natural gas, a stream comprising carbon monoxide or hydrogen, naphtha, butane, propane, diesel, kerosene, ethanol, methanol, aviation fuel, a coal derived fuel, a bio-fuel, an oxygenated hydrocarbon feedstock, and mixtures thereof. In some embodiments, the fuel may preferably comprise natural gas (NG). It should be noted that the first fuel 12 and the optional second fuel 24, each may be chosen from any of these examples of fuels described herein. In one embodiment the first fuel 12 and the optional second fuel 24 are same. The oxidant used in the disclosed systems may comprise any suitable gas containing oxygen, such as for example, air, oxygen rich air, oxygen depleted air, and/or pure oxygen.

Returning to FIG. 2, the off gas 48 generated in the purification system is mixed with the oxidant (not shown) and is sent to the combustor 58 disposed within the steam reforming zone 18 to generate heat for the endothermic reforming reaction. The exhaust gas 60 from the combustor zone 19 in the steam reforming zone 18 is sent to a heat exchanger 62, which heat exchanger 62 is used as a steam generator. In operation, water 64 is introduced in the heat exchanger 62 and is heated to form steam 14 and a cooled exhaust gas 66 is formed. The cooled exhaust gas 66 may be vented to the atmosphere. In some embodiments, the steam 14 generated in the heat exchanger 62 is used for the reforming reaction in the steam reforming zone 18. Any supplemental steam if needed for the reforming reaction (1) may be supplied from an external source (not shown).

It should be noted that, typically the overall steam to carbon ratio of a CPO zone 42 is less than about 2.0. The steam to carbon ratio of a conventional steam reforming or ATR process uses a steam to carbon ratio of about 3.0. Typically in steam reforming zone 18 of the systems described herein, the steam to carbon ratio is kept less than about 1.5, as only a partial conversion of the first fuel 12 in the steam reforming zone 18 is desirable. As only a partial conversion of the first fuel 12 is desired, the space velocity maintained in the steam reforming zone 18 is higher than the space velocity maintained in the traditional steam reforming catalysts.

In FIGS. 1-2, the purification system 50 produces the hydrogen rich product gas that may be used in applications requiring pure hydrogen. However the third reformate gas stream 49 from the shift zone 47 also comprises substantial amount of hydrogen and may be used for applications where high purity of hydrogen is not required. In one embodiment, a portion of the third reformate gas stream 49 may be recycles to the combustor 58 in the steam reforming zone 18 to be used as a fuel.

Figure 3:
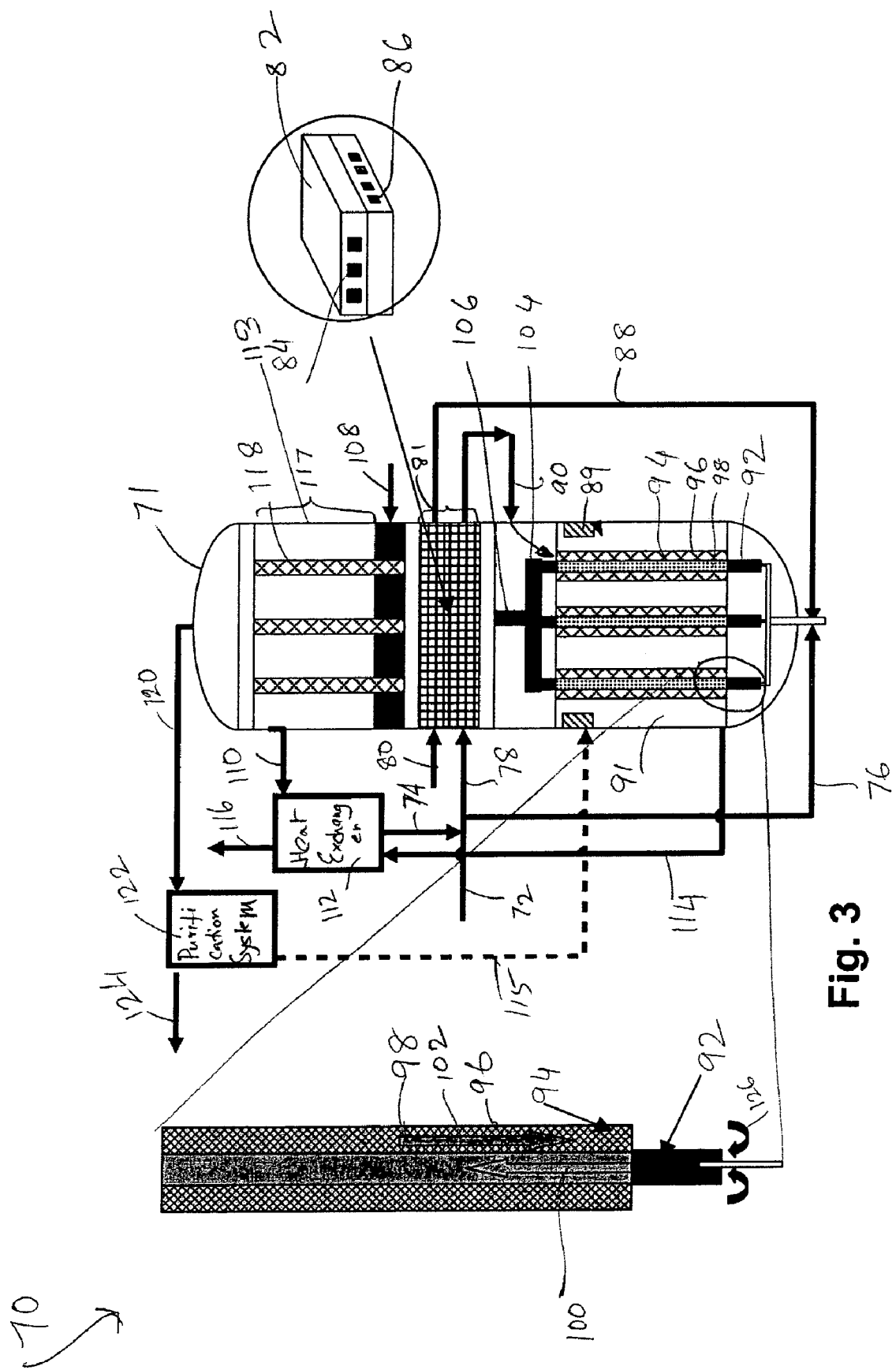
FIG. 3 illustrates another exemplary compact system for hydrogen production with counter current flow in the reactor.

FIGS. 3-6 illustrate several exemplary compact systems for hydrogen production in a single reactor 71. As shown in FIG. 3, the system 70 for hydrogen production comprises a single reactor 71. The reactor 71 comprises a steam reforming zone 94, a mixed reforming zone 92, a heat exchange zone 81 and a shift zone 113. The compact single reactor 71 comprises the following short-contact time catalysts: a steam reforming catalyst placed in the steam reforming zone 94 which steam reforming zone 94 is essentially a heat exchanger, a CPO catalyst in the mixed reforming zone 92; and a shift catalyst in the shift zone 113. Integrating all these catalysts into a reactor 71 (as shown in FIGS. 3-6) minimizes the capital cost and reduces the system footprint. The exemplary embodiments as illustrated in FIGS. 3-6 allow integration and simplification of the reformer beyond that of the conventional systems where separate reactor units are used for each reaction.

Returning to FIG. 3, a fuel 72 is mixed with steam 74 and a first fuel mixture 78 is introduced to the heat exchange zone 81 along with an oxidant 80, such as air. For the purpose of understanding, the oxidant is described as air in the embodiments described herein. It should be understood that any other oxidant as listed in the preceding sections may also be used. The heated mixture 90 is then fed to a steam reforming zone 94 comprising a plurality of tubes. Each tube comprises two coaxial tubes forming an outer annulus that is essentially the steam reforming zone 94 and an inner passage 98. The outer annulus of the coaxial tube comprises catalyst for the steam reforming. The steam reforming catalyst pre-reforms the heated mixture 90 at a temperature of about 200° C. to about 1200° C. depending upon the type of fuel as described in the previous section. The hot side 91 of the heat exchanger includes a combustor 89. A mixture of a fuel and air is combusted in the combustor to provide heat to the outer surface 96 of the outer annulus of the tubes. As shown in FIG. 3, the off gas 115 from the purification system 122 is used as a fuel for the combustor 91. Therefore, the unconverted fuel in the hydrogen production system present in the off gas 115 is utilized to generate heat within the system, thereby increasing the overall efficiency of the process. The heat generated by combusting the off gas 115 is used for the endothermic steam reforming reaction in the outer annulus of each tube. The steam reforming reaction generates a first reformate gas stream 126 comprising hydrogen, which first reformate gas stream 126 is introduced into the mixed reforming zone 92 adjacent to each tube.

Heated air 88 mixed with a optional second fuel mixture 76 and the pre-reformed first gas stream 126 is introduced into the mixed reforming zone 92 comprising a short-contact time CPO catalyst for further reforming. The syngas generated in the mixed reforming zone 92 passes through the inner passage 98 of each tube. The syngas is collected through a manifold 104 from each tube and forms a second reformate gas stream (not shown). The syngas produced in the mixed reforming zone 92 flows through the inner passages 98 of each tube thereby providing a counter current flow, wherein the syngas from the mixed reforming zone 92 and the pre-reformed gases flow in opposite directions as shown by the arrows 100 and 102 respectively. The heat is transferred from the hot syngas to the outer annulus to supply heat for the reforming reaction. Subsequently the second reformate gas stream from the manifold 106 is introduced to the heat exchange zone 81 comprising a heat exchanger.

The fuel 72 is mixed with steam 74 before it is introduced to the heat exchanger 82. The heat exchanger 82 is a blown-up version of heat exchanger 81. The heat exchanger 82 is a cross-flow heat exchanger, where the openings 86 are configured to receive the second reformate gas stream and the openings 84 are configured to receive a cold gas, which gas may a mixture of air, fuel and steam. The heat exchanger 82 is essentially two heat exchangers in series with one hot second reformate gas stream and two cold gas streams (air 80 & fuel-steam mixture 78). The air 80 and fuel mixture 78 are typically manifolded separately. Heat is transferred from channels in the hot second gas stream side to the cold gas side thereby cooling the second gas stream and heating the air 80 and the fuel and steam mixture 78 to form a heated air stream 88 and a heated fuel and steam mixture stream 90. The cooled second reformate gas stream from the heat exchanger 82 is sent to a plurality of tubes 118 in the shift zone 113, which tubes comprise a short-contact time shift catalyst to reduce the level of the CO and increase the hydrogen content. The shift reaction is an exothermic reaction and the heat generated by the reaction is utilized to preheat the water 108 fed into the shift reactor heat exchanger zone 117 outside of the shift catalyst tubes 118. The exit gas from the shift zone 113, a third reformate gas stream 120 rich in hydrogen is introduced into a purification system 122 as described in the previous sections. The remaining gas or the off gas 115 after separating the hydrogen in the purification system is introduced into the combustor 89, wherein the off gas 115 is burned to generate heat for the endothermic steam reforming reaction.

The preheated water 110 is introduced into a heat exchanger 112 to generate steam by utilizing the heat from the exhaust gas 114 that is formed by burning the off gas 115 in the combustor 89. The steam 74 generated in the heat exchanger 112 is used in the reforming reaction.

Figure 4:
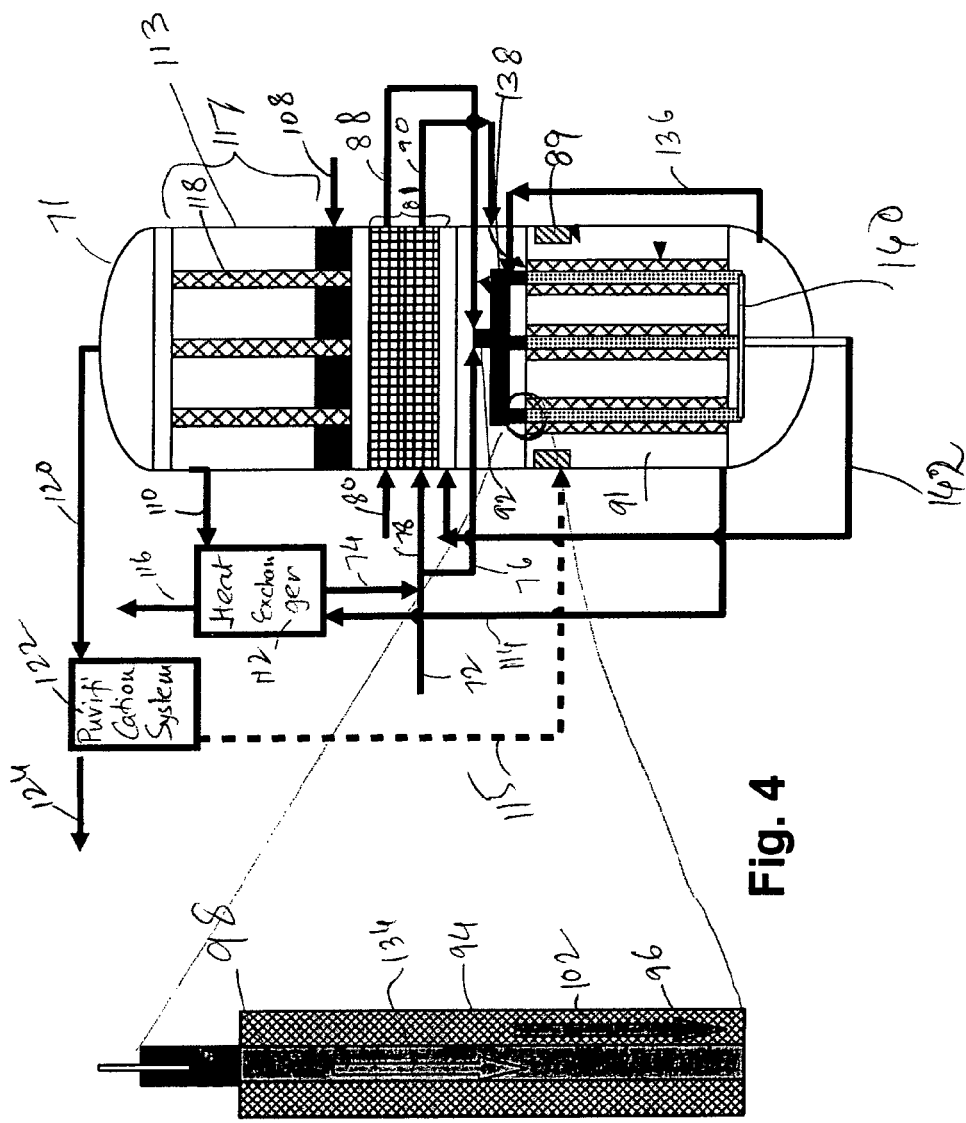
FIG. 4 illustrates yet another exemplary compact system for hydrogen production with co-current flow in the reactor.

FIG. 4 illustrates a compact system 130 for hydrogen production, wherein the heat transfer in the mixed reforming zone 92 and the steam reforming zone 94 takes place in a co-current flow. The syngas formed in the mixed reforming zone (indicated by arrow 134) flows co-current with the product gases from the reforming zone (indicated by arrow 102). The first reformate gas stream 136 that is the pre-reformed gas from the outer annulus (steam reforming zone 94) of each tube is sent to the manifold 138. The mixture of the first reformate gas stream 136 and the syngas from the steam reforming zone 92 flows through the inner passage 98 of each tube and is collected through a manifold 140 to form the second reformate gas stream 142. The second reformate gas stream 142 is introduced to the heat exchange zone 81.

Figure 5:
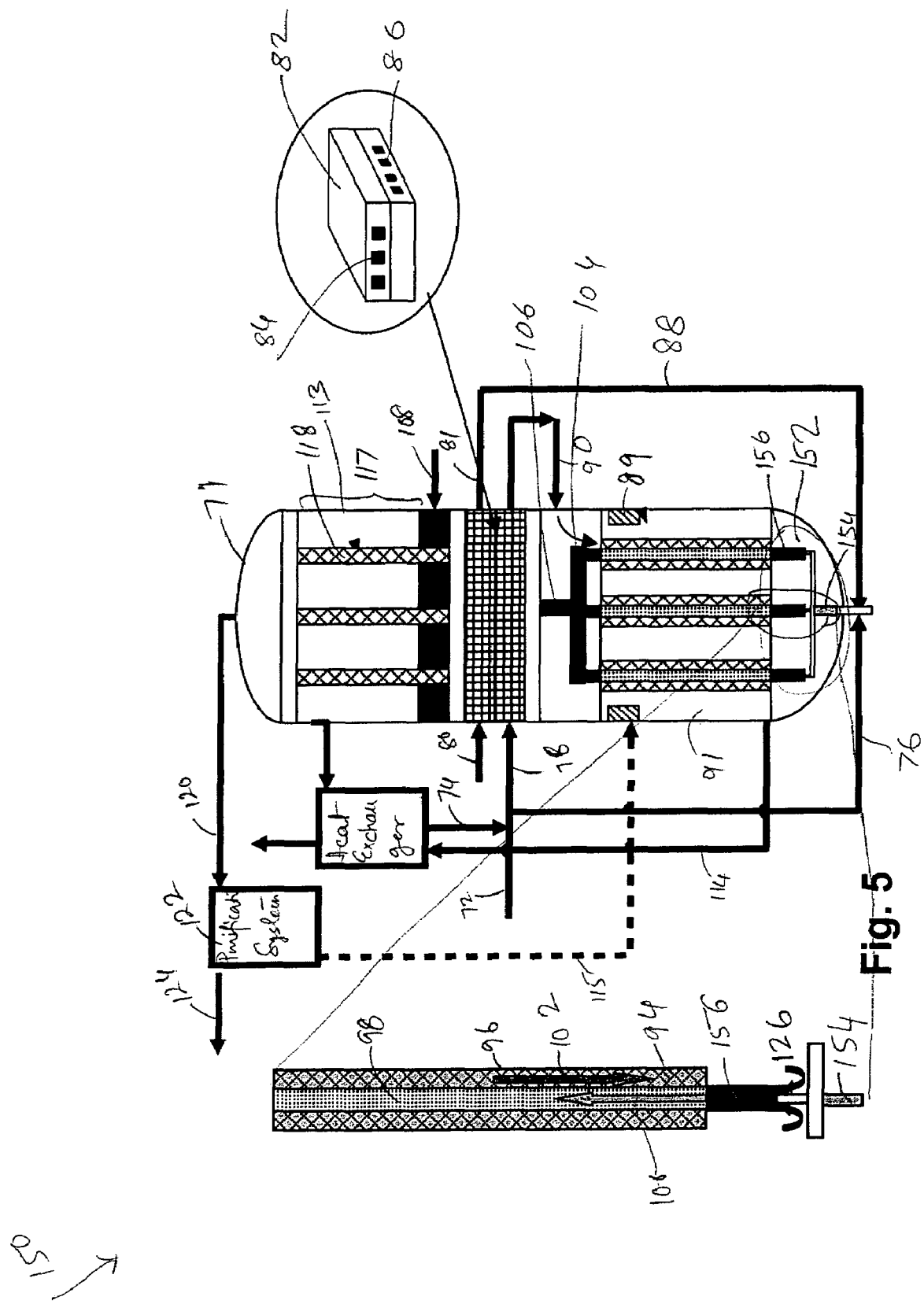
FIG. 5 illustrates an exemplary compact system of FIG. 3 for hydrogen production with two catalytic partial oxidation zones.

FIG. 5 illustrates a compact system 150 for hydrogen production wherein the mixed reforming zone 152 comprises a first catalytic partial oxidation zone 154 and a second catalytic partial oxidation zone 156. The first CPO zone 154 is common for all the tubes whereas the second CPO zone 156 is adjacent to each tube. The products from the steam reforming zone and the CPO zones flow countercurrent in each tube as indicated by arrows 102 and 100 respectively. The configuration of the exemplary system 150 as illustrated in FIG. 5 is similar to that of the system illustrated in FIG. 3. The only difference in the systems 70 (in FIG. 3) and 150 (in FIG. 5) is that the mixed reforming zone 152 in FIG. 5 comprises two zones.

Returning to FIG. 5, the first reformate gas stream 126 (as shown in the enlarged portion of a tube) comprising hydrogen from the reforming zone bypasses the first CPO zone 154. The product from the first CPO zone and the first reformate gas stream 126 from the reforming zone are fed into the second CPO zone 156. As the first gas stream 126 bypasses the first CPO zone 154, the heated air 88 (introduced in the first CPO zone 154) is prevented from mixing with the first gas stream 126 and oxidizing the $H_2$ and CO in the pre-reformed first gas stream 126.

The pre-reformed first gas stream 126 and the product gases from the first CPO zone 154 are then mixed together over the second CPO zone 156 to complete the reforming reactions. The two stages of the CPO catalyst can be joined into one stage as shown in FIGS. 3-4, since the partial oxidation reactions are selective to $H_2$ and CO formation over $H_2O$ and $CO_2$ formation in the heterogeneous (solid/catalyst) phase. In one embodiment, the systems described herein may comprise a cooling zone after the steam reforming zone 18 to quench the first reformate gas stream 20 to prevent the oxidation reaction of hydrogen present in the first reformate gas stream 20 (described in detail later).

Figure 6:
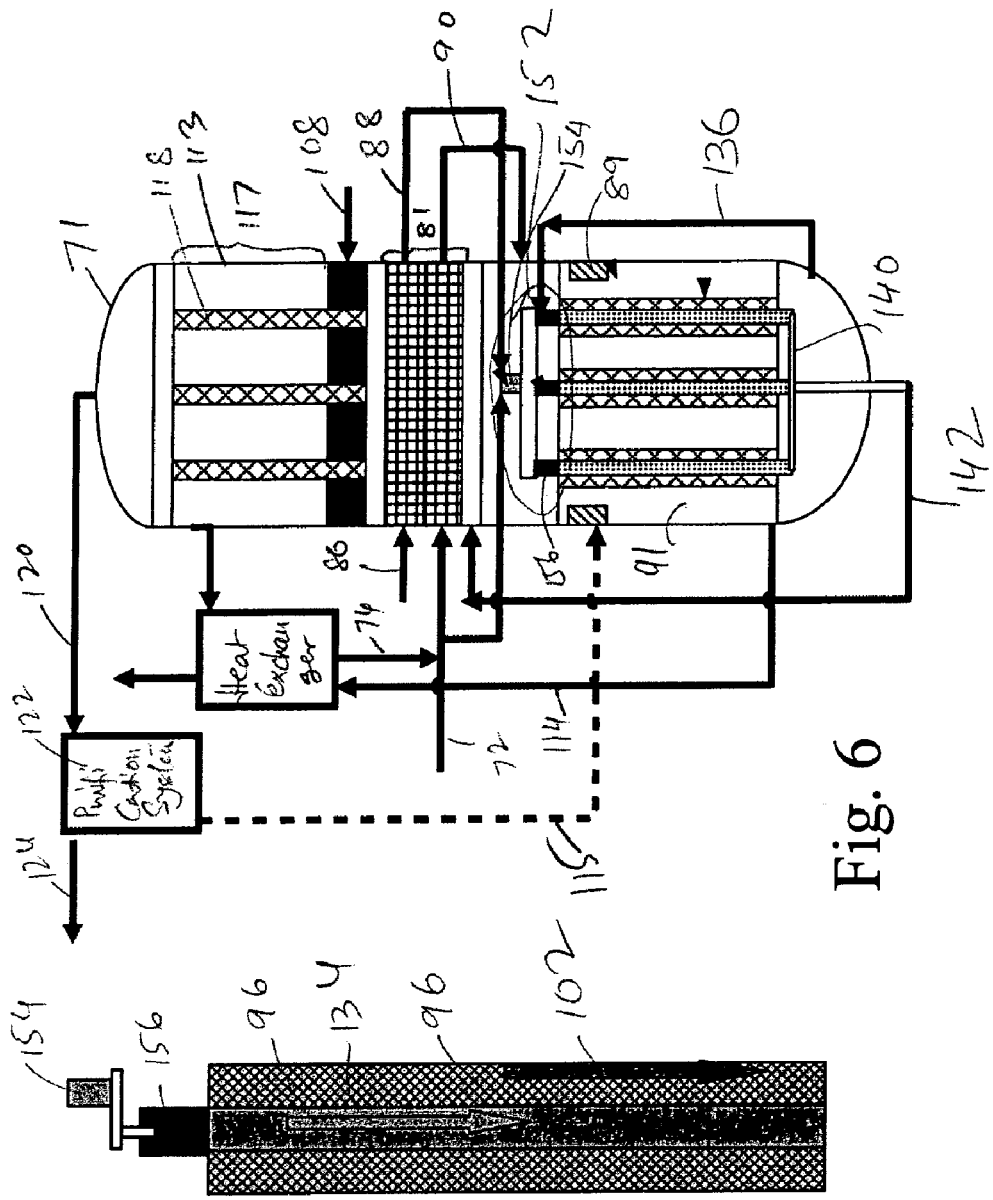
FIG. 6 illustrates an exemplary compact system of FIG. 4 for hydrogen production with two catalytic partial oxidation zones.

FIG. 6 illustrates a compact system 160 for hydrogen production, wherein the mixed reforming zone 152 comprises a first CPO zone 154 and a second CPO zone 156. The first CPO zone 154 is common for all the tubes whereas the second CPO zone 156 is adjacent to each tube. The products from the reforming zone and CPO zones flow co-current in each tube as indicated by arrows 102 and 134 respectively. The configuration of the exemplary system 160 as illustrated in FIG. 6 is similar to that of the system 130 illustrated in FIG. 4. The only difference in the systems 130 (in FIG. 4) and 160 (in FIG. 6) is that the mixed reforming zone 152 in FIG. 6 comprises two zones. The optional second fuel mixture 76 and heated air 88 are introduced to the first CPO zone 154. The product of the reforming zone, the first reformate gas stream 136 bypasses the first CPO zone 154 and is directly introduced to the second CPO zone 156. The products of reforming zone (shown by arrow 102) and the CPO zones (shown by arrow 134) flow co-currently as shown in the enlarged portion of the tube shown in FIG. 6.

Figure 7:
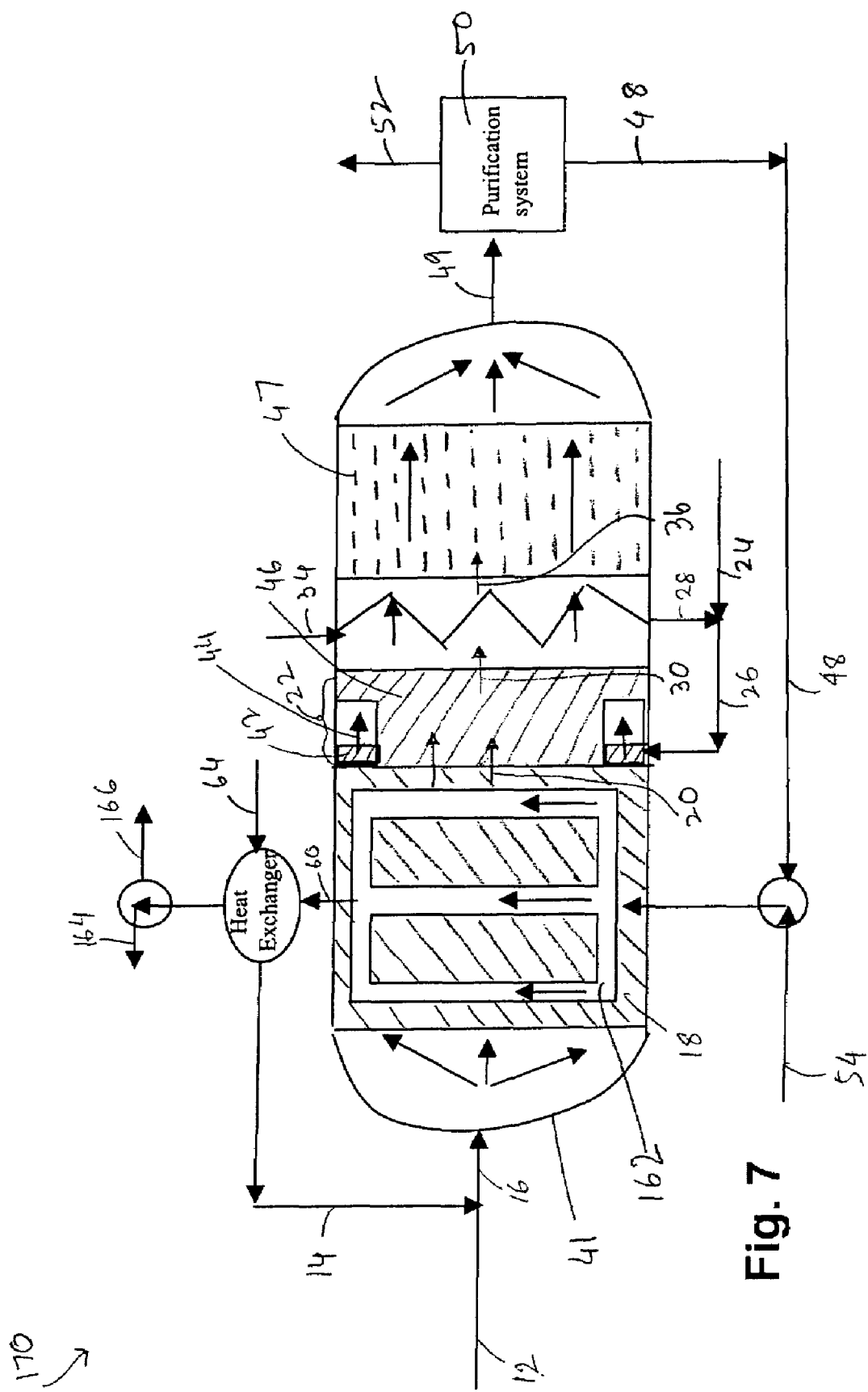
FIG. 7 illustrates an exemplary compact system for hydrogen production with unmixed combustion in the steam reforming zone.

FIG. 7 illustrates an exemplary compact system 170 for hydrogen production with unmixed combustion (UMC) in the steam reforming zone 18. The exemplary system 170, as illustrated in FIG. 7, comprises an unmixed combustor 162 disposed within the steam reforming zone 18. As shown in FIG. 7, in UMC, the oxidant 54 and the off gas 48 (fuel for the UMC) are not mixed. In-stead, in two alternating cycles, oxidant 54 and off gas 48 are passed over a metal (M) dispersed on a substrate within the unmixed combustor 162. In one cycle, the oxidant 54 is passed through the unmixed combustor 162 and heat is released by oxidizing the metal (M) to metal oxide (MO) in the following reaction (6)

$$M + 1/2 O_2 \Leftrightarrow MO \quad (6)$$

Subsequently, in the second cycle MO is reduced back to M using the off gas 48, which off gas acts as a reductant. The following reactions (7) and (8) shows two non-limiting exemplary reactions in the unmixed combustor 162 wherein the metal is nickel and the off gas comprises methane ($CH_4$):

$$Ni + 1/2 O_2 \rightarrow NiO \quad (7)$$

$$4NiO + CH_4 \rightarrow 4Ni + CO_2 + 2H_2O \quad (8)$$

The net combined reaction is the same as traditional combustion reaction (9):

$$CH_4 + 2O_2 = CO_2 + 2H_2O \quad (9)$$

In the first cycle, the oxidant 54 comprising oxygen is passed through the unmixed combustor 162 and the metal (nickel) present in the unmixed combustor 162 gets oxidized to nickel oxide. In the second cycle, the off gas 48 comprising methane-passes through the unmixed combustor 162 and nickel oxide reacts with methane and is reduced to the metal form of nickel. Therefore, in the first cycle, the exit gas 60 is depleted in oxygen and in the second cycle, the exit gas 60 comprises $CO_2$ and water. In this process of unmixed combustion, two separate unmixed streams 60 are generated as exhaust streams in two cycles from the unmixed combustor 162. Similar reactions (7-9) take place in the unmixed combustors while using any metal including but not limiting to nickel, platinum, rhodium etc. Since the oxidant 54 and off gas 48 feed streams are not mixed, the product streams from the unmixed combustor 162 are also not mixed. In an exemplary embodiment, the oxidant 54 is air. In the cycle when the air is fed to oxidize the metal in the unmixed combustor 162, the product stream is vitiated air 164 and in the cycle when the off gas 48 is fed, the separate product stream 166 is rich in $CO_2$ and also comprises $H_2O$. Hence, the UMC process includes inherent $CO_2$ separation in the unmixed combustor 162. Since the air and fuel are not mixed, UMC also prevents $NO_x$ formation as the nitrogen present in the air exits the unmixed combustor 162 as a separate stream of vitiated air. Since UMC occurs at lower temperatures compared to conventional combustion, $NO_x$ formation at high temperature may also be avoided. In one embodiment, wherein the fuel fed into the unmixed combustor 162 is nitrogen free, the combustion process may result in formation of very little or zero level of $NO_x$. So the advantage of using unmixed combustion to provide the heat in the steam reforming zone 18 as described in the above sections, is the ability to generate a first reformate gas stream 20 in a process that facilitates inherent $CO_2$ separation with zero $NO_x$ emissions.

Figure 8:
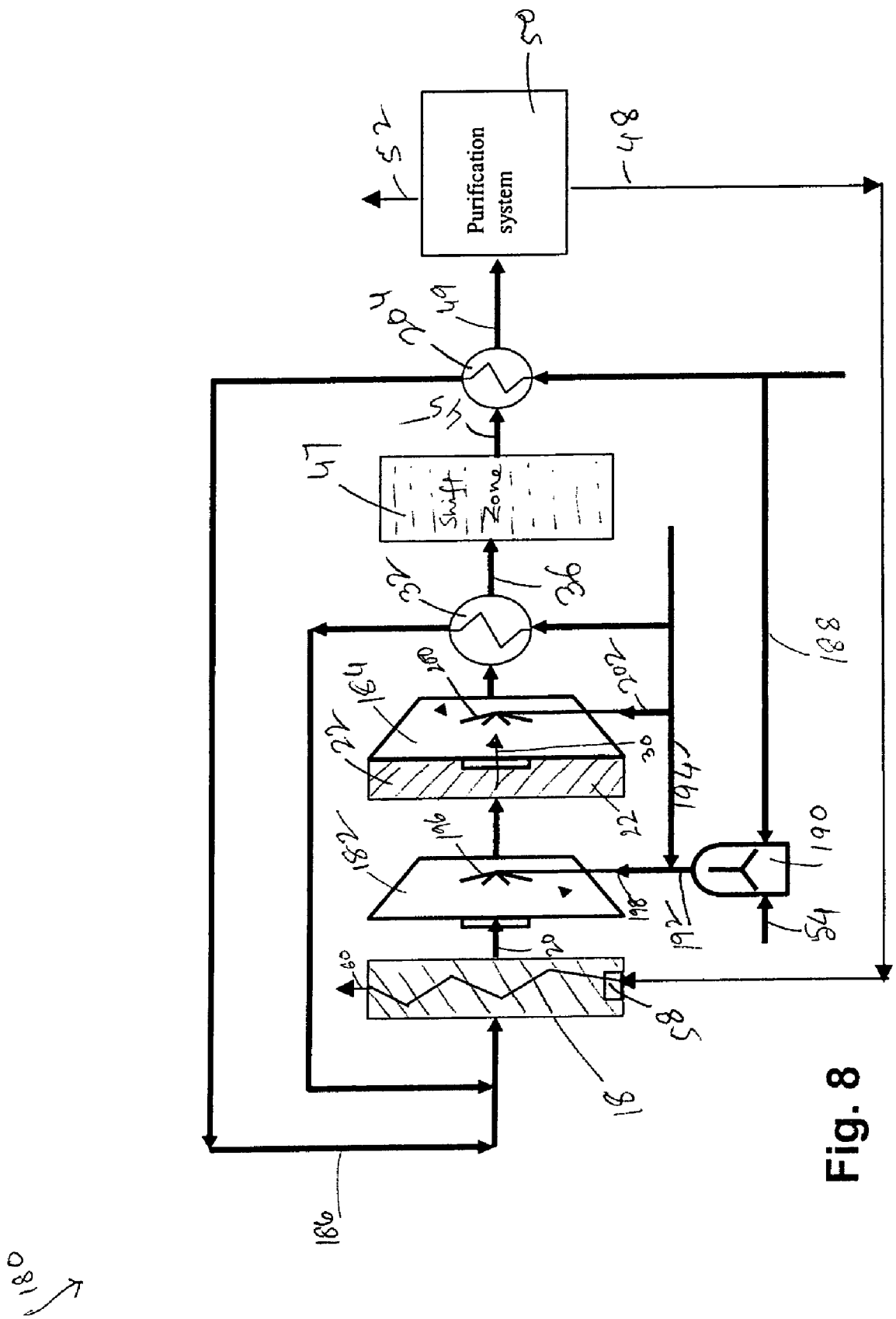
FIG. 8 illustrates yet another exemplary system for hydrogen production.

FIG. 8 illustrates yet another exemplary system 180 for hydrogen production with a cooling zone 182 disposed between the steam reforming zone 18 and mixed reforming zone 22. In some embodiments, the systems for hydrogen production described herein may advantageously comprise a first cooling zone 182 disposed after the steam reforming zone 18 and a second cooling zone 184 disposed after the mixed reforming zone 22. The first fuel 186 is sent to the steam reforming zone 18 and the second fuel 188 is sent to a mixer 190. In one embodiment, wherein the first fuel 186 comprises natural gas, the first reformate gas stream 20 exiting the steam reforming zone 18 comprises hydrogen and may be at a temperature above 500° C. Once an oxidant, such as air is introduced directly to the first gas reformate stream 20, the hydrogen present in the first gas reformate stream 20 may react with oxygen and consume a substantial portion of the oxygen present in the oxidant stream 54 before the mixed stream 192 reaches the CPO catalyst in the mixed reforming zone 22. Therefore, the mixed stream 192 may be depleted of oxygen and the conversion of the second fuel 188 is affected due to the lack of oxygen.

As described in the preceding sections, the mixed reforming zone 22 comprises a short-contact CPO catalyst. As shown in FIG. 8, the oxidant 54 and the second fuel 188 are uniformly pre-mixed in the mixer 190 before being introduced to the mixed reforming zone 22 comprising the CPO catalyst. The mixed stream 192 in the mixer 190 should be at an elevated temperature required to start the CPO reactions 3-5 (as given earlier), once the mixed stream 192 is exposed to the CPO catalyst in the mixed reforming zone 22. However, the temperature in the mixer 190 needs to be controlled in such a way that the oxidation reaction of the fuel such as methane is avoided on the metal surface of the mixer 190. The configuration shown in FIG. 8 achieves the proper mixing process in the mixer 190 to achieve this optimum temperature to prevent the oxidation reaction of the fuel and to facilitate the initiation of the CPO reactions.

As shown in FIG. 8, the oxidant 54 is mixed with second fuel 188 at room temperature in the mixer 190. The mixed stream 192 and a small first stream of water 194 generate an inlet stream 198 to the first cooling zone 182. The inlet stream 198 flows through a plurality of gas-assisted atomizing nozzles 196 uniformly distributed in the first cooling zone 182. The water present in the inlet stream 198 vaporizes in the first cooling zone 182 utilizing the heat available in the first reformate gas stream 20. The latent heat of water vaporization and mixing with the mixed stream 192 at room temperature quench the first reformate gas stream 20 in the first cooling zone 182. The volume expansion due to the water vaporization process creates a turbulence in the first cooling zone 182, which turbulence enhances the mixing between the first reformate gas steam 20 and the inlet stream 198 to the first cooling zone 182. This turbulence also minimizes the metal surface area required to achieve uniform mixing of the inlet stream 198 and the first reformate gas stream 20 in the first cooling zone 182.

In some embodiments, the oxygen content in the inlet stream 198 is typically low as the oxidant 54 is mixed with the second fuel 188 and water 194. The low concentration of oxygen in the inlet stream 198 prevents the oxidation reaction of the hydrogen present in the first reformate gas stream 20.

The exemplary system 180 as shown in FIG. 8 further comprises a second cooling zone 184 disposed in between the mixed reforming zone 22 and the heat exchange zone 32. In operation, typically the temperature of the second reformate gas stream 30 from the mixed reforming zone 22 is at least ~700° C. The second cooling zone 184 reduces the heat load on the heat exchange zone 32 by pre-cooling the second reformate gas stream 30. The pre-cooling of the second reformate gas stream 30 makes the heat exchange zone 32 more cost effective as the heat exchange zone 32 may operate at a lower temperature. The second cooling zone 184 may also comprise a plurality of gas-assisted atomizing nozzles 200 uniformly distributed in the second cooling zone 184. The nozzles 200 are used to introduce a second portion of water 202 to quench the second reformate gas stream 30. The second portion of water 202 vaporizes in the second cooling zone 184. The latent heat of water vaporization in the second cooling zone 184 quenches the second reformate gas stream 30 and lowers the temperature of the second reformate gas stream to at least about 500° C. In one embodiment, a portion of the second reformate gas stream 30 may be used in the gas-assisted nozzles 200 for atomizing the water in the second cooling zone 184. This quenching process in the second cooling zone 184 also generates additional steam by vaporizing the second portion of water 202. Generation of this addition steam enhances the down stream shift reaction (2) in the shift zone 47. The shift reaction (2) is an exothermic reaction and the cooled stream 36 is converted to a hot stream 45 exiting the shift zone 47. The heat generated by the shift reaction in the shift zone 47 may be utilized in a heat exchanger 204 before the hot stream 45 is introduced to the purification system 50. The heat exchanger 204 is used for pre heating the first fuel 186 before the first fuel 186 is introduced to the steam reforming zone 18 to achieve a higher efficiency in the overall hydrogen production process. The first and second cooling zones 182 and 184, as illustrated in FIG. 8 may be used in conjunction with all the exemplary systems described above.

The systems for production of hydrogen described herein have many advantages. In the disclosed compact systems for hydrogen production, the peak metal temperature (PMT) in the reforming zone is much lower than a conventional reforming system: In some embodiments, the capital cost and operational and maintenance (O & M) cost are lowered as the PMT is reduced to less than about 600° C. Lowering of PMT allows the use of stainless steel instead of costly high temperature alloys, such as high strength nickel-chromium-iron alloys, for example Inconel in the reforming zone.

The capital and O&M costs are significantly lowered when the size of the reactor is reduced by increasing the GHSV by utilization of short contact time catalysts. The overall efficiency of the heat-integrated processes described herein is high and facilitates in reduction of fuel and consumables. Staging the CPO catalysts in two zones and integrating the steam reforming catalyst, the CPO catalyst and the shift catalysts in one single reactor enhance the efficiency of the process. The efficiency of such a compact process is high due to the efficient heat integration. The efficiency of the overall process also increases by utilizing the off-gas from the purification system to generate heat for the reforming process, steam generation and preheating of the fuel. Therefore, the disclosed systems recover the excess heat from the off gas efficiently that allows the efficiency of overall process to be improved significantly over conventional hydrogen production processes. The systems for hydrogen production described herein are also compact as a result of high GHSV and the short contact time catalysts in the reforming and CPO zones. Conventional steam reforming processes typically exhibit poor turndown capability, due to the size of the furnace. The systems described herein exhibit good turndown capability.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. Thus, it is intended that the present invention cover all suitable modifications and variations as come within the scope of the appended claims and their equivalents.

What is claimed is:

1. A system for production of hydrogen comprising:
   at least one steam reforming zone configured to receive a first fuel and steam to produce a first reformate gas stream comprising hydrogen using a steam reforming process; and a mixed reforming zone configured to receive an oxidant and a second fuel to produce a second reformate gas stream comprising hydrogen, wherein said mixed reforming zone comprises a first catalytic oxidation zone and a second catalytic oxidation zone;

wherein said first reformate gas stream is sent to said mixed reforming zone to complete said reforming process, said second fuel is introduced in said first catalytic oxidation zone and said first reformate gas stream is sent directly to said second catalytic partial oxidation zone.

2. The system of claim 1 further comprising a heat exchange zone and a shift reaction zone.

3. The system of claim 2, wherein said heat exchange zone is configured to receive an said oxidant and said second reformate gas stream comprising hydrogen wherein heat is transferred from said second reformate gas stream to said oxidant to generate a cooled second gas stream and a heated oxidant.

4. The system of claim 2, wherein said shift reaction zone is configured to receive said cooled second reformate gas stream and steam to generate a third reformate gas stream rich in hydrogen.

5. The system of claim 2 further comprising a purification stream, wherein said purification system generates an off gas and a hydrogen rich product gas.

6. The system of claim 5 further comprising a combustor configured to be placed in said at least one steam reforming zone to burn said off gas and generate an exhaust stream.

7. The system of claim 6, wherein said off gas is recycled to said combustor to transfer heat from said combustor to said at least one steam reforming zone.

8. The system of claim 7, wherein said combustor is an unmixed combustor configured to generate a separate stream rich in carbon dioxide.

9. The system of claim 7 further comprising a heat exchanger configured to receive said exhaust stream and water, wherein heat is extracted from said exhaust gas to produce steam and a cooled exhaust gas.

10. The system of claim 1, wherein said first fuel and second fuel is selected from the group consisting of natural gas, methane, methanol, ethanol, a stream comprising CO or $H_2$, naphtha, butane, propane, diesel, kerosene, an aviation fuel, a coal derived fuel, a bio-fuel, an oxygenated hydrocarbon feedstock, and mixtures thereof.

11. The system of claim 10, wherein said first fuel and second fuel comprises at least one selected from the group consisting of $CO_2$, steam, $O_2$ and $N_2$.

12. The system in claim 1, wherein said first fuel comprises natural gas.

13. The system of claim 12, wherein said at least one steam reforming zone is configured to operate at about 550° C. to about 1200° C.

14. The system of claim 10, wherein said at least one steam reforming zone is configured to operate at about 350° C. to about 850° C. and said first fuel comprises ethanol.

15. The system of claim 10, wherein said at least one steam reforming zone is configured to operate at about 200° C. to about 400° C. and said first fuel comprises methanol.

16. The system of claim 1, wherein said at least one steam reforming zone, mixed reforming zone, heat exchange zone and shift reaction zone are configured to be placed in a vessel.

17. The system of claim 5, wherein said purification system comprises an unit is selected from the group consisting of at least one chemical absorber, pressure swing absorber, cryogenic separator, membrane separator and liquefier.

18. The system of claim 1, further comprising a first cooling zone and a second cooling zone, wherein said first cooling zone is disposed between said steam reforming zone and said mixed reforming zone and said second cooling zone is disposed between said mixed reforming zone and said heat exchange zone.

19. The system of claim 18, wherein said first cooling zone is configured to cool said first reformate gas stream prior to being sent to said mixed reforming zone.

20. The system of claim 19, wherein said first reformate gas stream is cooled using an inlet stream to said first cooling zone.

21. The system of claim 20, wherein said inlet stream comprises said second fuel, said oxidant and water.

22. The system of claim 18, wherein said first and second cooling zones comprise a plurality of gas assisted nozzles.

23. A system for production of hydrogen comprising:
at least one steam reforming zone configured to receive a first fuel and steam to produce a first reformate gas stream comprising hydrogen in a reforming process;
a first catalytic oxidation zone and a second catalytic oxidation zone, wherein said first catalytic zone is configured to receive a heated oxidant and a second fuel to produce a second reformate gas stream comprising hydrogen and said first reformate gas stream is sent directly to said second catalytic partial oxidation zone to complete said reforming process;
a heat exchange zone and a shift zone, wherein said heat exchange zone is configured to receive an oxidant and said second reformate gas stream, wherein heat is transferred from said second reformate gas stream to said oxidant to generate a cooled second reformate gas stream and said heated oxidant; and
a purification stream, wherein said purification system generates an off gas and a hydrogen rich product gas and a combustor configured to be placed in said at least one steam reforming zone to burn said off gas and generate an exhaust stream.

24. A method for producing hydrogen comprising
steam reforming a first fuel to produce a first reformate gas stream comprising hydrogen;
partially oxidizing a second fuel and an oxidant in a first catalytic partial oxidation zone to produce a second reformate gas stream comprising hydrogen;
introducing said first reformate gas stream to a second catalytic oxidation zone; and
introducing a mixture of said first reformate gas stream and second reformate gas stream to a shift zone to produce a third reformate gas stream rich in hydrogen.

* * * * *